(12) United States Patent
Tanaka

(10) Patent No.: US 7,692,822 B2
(45) Date of Patent: Apr. 6, 2010

(54) IMAGE READING APPARATUS, IMAGE FORMING APPARATUS AND IMAGE READING METHOD

(75) Inventor: Masahiko Tanaka, Chiyoda-ku (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1428 days.

(21) Appl. No.: 11/009,001

(22) Filed: Dec. 13, 2004

(65) Prior Publication Data

US 2006/0033965 A1      Feb. 16, 2006

(30) Foreign Application Priority Data

Aug. 16, 2004    (JP) .............................. 2004-236361

(51) Int. Cl.
*H04N 1/04*    (2006.01)
*H04N 1/46*    (2006.01)

(52) U.S. Cl. ........................ 358/474; 358/475; 358/497; 358/471

(58) Field of Classification Search .................. 358/474, 358/475, 497, 471, 484, 487; 315/169.3
See application file for complete search history.

(56) References Cited

U.S. PATENT DOCUMENTS 5,525,866 A * 6/1996 Mueller et al. ............ 315/169.3
5,598,067 A * 1/1997 Vincent et al. ........... 315/169.3
7,362,478 B2 * 4/2008 Mangerson ................. 358/474

FOREIGN PATENT DOCUMENTS

| JP | 62-171253 U | 10/1987 |
|---|---|---|
| JP | 63-048954 A | 3/1988 |
| JP | 03-258075 A | 11/1991 |
| JP | 07-072557 A | 3/1995 |
| JP | 10-020413 A | 1/1998 |
| JP | 10-257250 A | 9/1998 |
| JP | 2000-115470 | 4/2000 |
| JP | 2000-358133 A | 12/2000 |
| JP | 2001-148765 A | 5/2001 |
| JP | 2002-328438 A | 11/2002 |
| JP | 2004-193714 A | 7/2004 |

* cited by examiner

*Primary Examiner*—Houshang Safaipour
(74) *Attorney, Agent, or Firm*—Morrison & Foerster LLP

(57) ABSTRACT

The image reading apparatus comprises an original document platen on which an original document is placed, an electroluminescent layer disposed inside the original document platen, transparent electrodes that cause each area of the electroluminescent layer to emit light, and a light receiving device that is disposed opposite the original document across the original document platen such that the light receiving device can receive the light from the electroluminescent layer that is reflected off of the original document.

17 Claims, 10 Drawing Sheets

IMAGE READING APPARATUS, IMAGE FORMING APPARATUS AND IMAGE READING METHOD

This application claims priority from Japanese Patent Application No. 2004-236361, filed Aug. 16, 2004, the contents of which are incorporated herein by reference.

BACKGROUND OF THE INVENTION

1. Field of the Invention

The present invention relates to an image reading apparatus such as a scanner or copier, as well as to an image reading method and image forming apparatus, and more particularly, to an image reading apparatus that reads an original document placed on an original document platen and obtains the image data thereon, as well as to an image reading method and an image forming apparatus that use this image reading apparatus.

2. Description of the Prior Art

Scanners, copiers and similar apparatuses belonging to the conventional art use an image reading apparatus that reads an original document placed on an original document platen and obtains image data therefrom. Such an image reading apparatus may comprise an apparatus having a contact-type equal magnification optical system that is specially adapted to document reading or an apparatus having a reduction optical system that can also read some three-dimensional objects. A reading apparatus having a contact-type equal magnification optical system can be easily made compact in size, but because it has a short focal depth, is not well suited to reading three-dimensional objects. A reduction optical system-based reading apparatus, on the other hand, can read three-dimensional objects, but requires a long optical path from the original document to the photoelectric conversion element, and is accordingly more difficult to make compact in size than a contact-type apparatus.

The reduction optical system-based image reading apparatus 100 of the conventional art has an original document platen 101 on which an original document S is placed, as well as a first slider unit 102, a second slider unit 103, a lens 104 and a photoelectric conversion element 105 disposed underneath the original document platen 101, as shown in FIG. 10. Furthermore, the first slider unit 102 includes a light source 106, a reflecting plate 107 and a first reflecting mirror 108. The second slider unit 103 includes a second reflecting mirror 109 and a third reflecting mirror 110. In this image reading apparatus 100, the light emitted from the light source 106 irradiates the original document S either directly or via the reflecting plate 107. The light that reflects off of the surface of the original document S is reduced by the lens 104 and forms an image on the light-receiving surface of the photoelectric conversion element 105 via the first through third reflecting mirrors 108-110.

In connection with this type of image reading apparatus, a technology has been disclosed that employs an electroluminescent (EL) lamp as the light source 106, which traditionally comprises a fluorescent or halogen lamp (see, for example, Japanese Patent Application Laid-Open No. 2000-115470). This EL lamp can have a thin, flat construction and is used as a low-power, low-heat light source. The invention described in the cited patent document has, as a light source, an EL lamp having two longitudinal flat plate-shaped light emitting areas and a slit formed therebetween, enabling the height of the image reading apparatus (the vertical direction in FIG. 10) to be reduced.

However, in the conventional image reading apparatus 100 described above, the longitudinal EL lamp is moved by a slider unit. In this construction, in order to avoid contact between the original document platen and the slider unit, an appropriate distance must be maintained therebetween. In particular, where the user presses the original document onto the original document platen or a heavy original document such as a dictionary is placed on the platen, the platen may warp in the center. As a result, to allow for this warping, a gap of at least several millimeters must exist between the slider unit and the underside of the original document platen. At the same time, because a prescribed level of illumination must be received from the original document surface in order to obtain a certain level of output from the photoelectric conversion element, the greater the distance between the light source and the original document, the brighter the light source must be. Accordingly, an image reading apparatus that can be used with a lower-intensity light source is desired.

Although the conventional image reading apparatus 100 described above is more compact than in the case where the conventional fluorescent light source or the like is used, because a longitudinal flat plate-shaped EL lamp is mounted on a slider unit, it cannot be made sufficiently compact. Furthermore, in order to reduce the burden on the drive apparatus that drives the slider unit, it is preferred that the slider unit be made more lightweight and compact.

SUMMARY OF THE INVENTION

The present invention was devised in order to resolve the problems inherent in the conventional image reading apparatus described above. In other words, an object of the present invention is to provide an image reading apparatus, image reading method and image forming apparatus that enable a low-intensity, low-power light source to be used, as well as enable the slider unit to be made thin and lightweight.

The image reading apparatus of the present invention devised in order to resolve the above problems comprises an original document platen on which an original document is placed, an electroluminescent layer disposed inside the original document platen, transparent electrodes that cause each area of the electroluminescent layer to emit light, and a light receiving device that is disposed opposite the original document across the original document platen such that the light receiving device can move parallel to the original document platen and receive the light from the electroluminescent layer that is reflected off of the original document.

In addition, the image reading method of the present invention devised in order to resolve the above problems comprises the steps of (1) irradiating the original document placed on the original document platen with the light emitted by the electroluminescent layer disposed inside the original document platen, and (2) receiving the light from the electroluminescent layer that is reflected off of the original document.

According to the image reading apparatus of the present invention, light emitted from the electroluminescent layer disposed inside the original document platen strikes the original document placed on the original document platen. In other words, the distance between the electroluminescent layer comprising the light source and the original document does not exceed the thickness of the original document platen. As a result, the light source is disposed much closer to the original document than in the case of the prior art in which the light source is disposed on a slider unit. Therefore, sufficient brightness is obtained even if a low-intensity, low-power light source is used. Furthermore, because the light source need not be mounted on the slider unit, the slider unit can be made thin and lightweight. The light-receiving device described herein may comprise either a device having built-in mirrors but no photoelectric conversion elements (a reduction optical system) or a device having a built-in photoelectric conversion element (an equal magnification optical system).

In addition, the image forming apparatus of the present invention comprises an image reading apparatus that reads an original document and outputs image signals and a printing device that forms images based on the image signals. Here, the image reading apparatus comprises an original document platen on which an original document is placed, an electroluminescent layer disposed inside the original document platen, transparent electrodes that cause each area of the electroluminescent layer to emit light, and a light receiving device that is disposed opposite the original document across the original document platen such that it can move parallel to the original document platen and receive the light from the electroluminescent layer that is reflected off of the original document.

BRIEF DESCRIPTION OF THE SEVERAL VIEWS OF THE DRAWING

These and other objects and features of the present invention will become clear from the following description taken in conjunction with the preferred embodiments thereof with reference to the accompanying drawings, in which.

DESCRIPTION OF THE PREFERRED EMBODIMENTS

A preferred embodiment of the present invention will be described in detail below with reference to the attached drawings. In this embodiment, the present invention is applied in an image reading apparatus used in a copier, scanner or the like.

Figure 1:
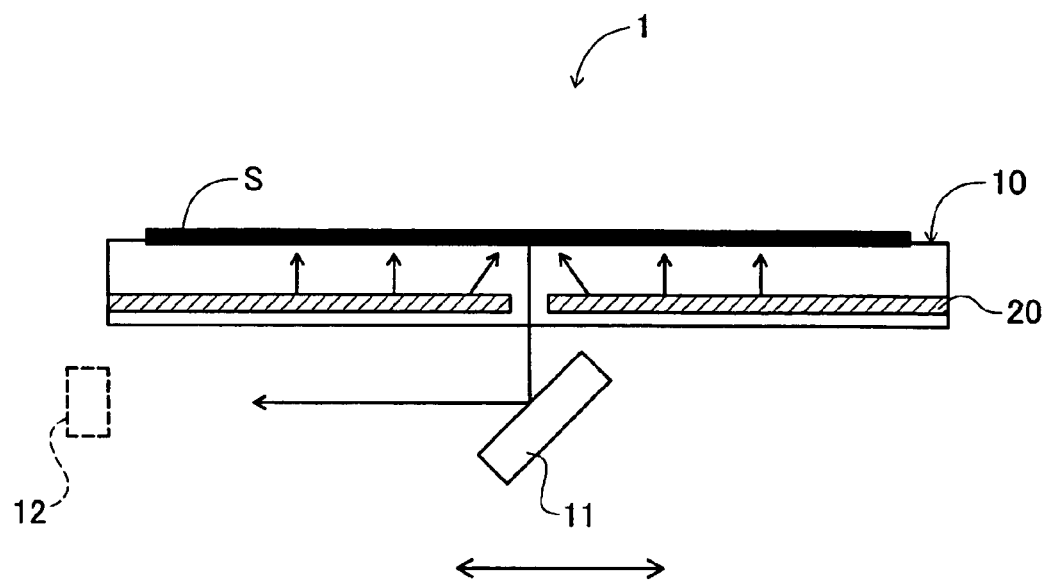
FIG. 1 is a cross-sectional drawing showing the basic construction of an image reading apparatus of the present invention.

The image reading apparatus 1 of this embodiment has an original document platen 10 and a reflecting mirror 11, as shown in FIG. 1. An original document S is placed on the original document platen 10 and an EL light source 20 is disposed inside the original document platen 10. The reflecting mirror 11 is mounted to a slider unit or the like, and can move along the original document platen 10. This image reading apparatus 1 has a reduction optical system, as well as a lens, a linear photoelectric conversion element 12 and the like, and the light reflected from the reflecting mirror 11 is input to the photoelectric conversion element 12.

Figure 2:
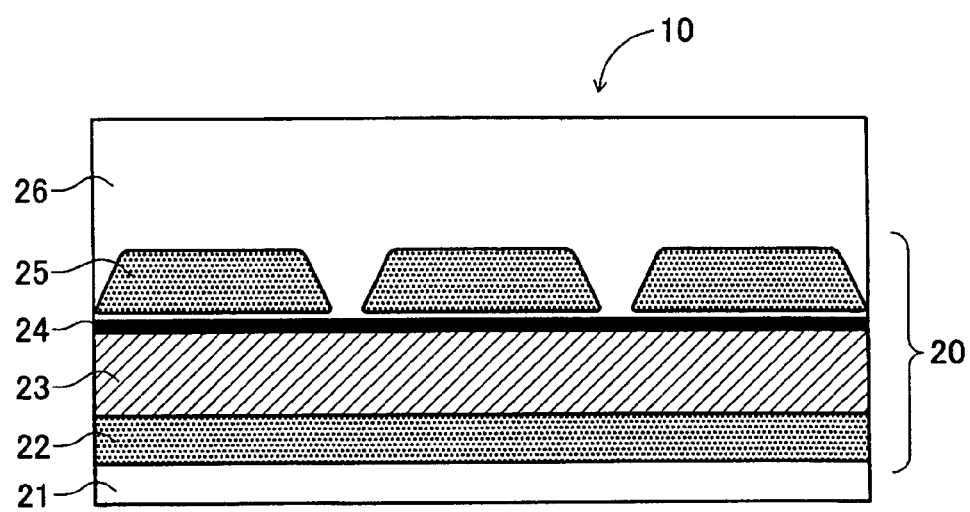
FIG. 2 is a cross-sectional drawing showing the basic construction of an organic EL light source.

As shown in the enlarged section of FIG. 2, the original document platen 10 comprises a glass substrate layer 21, a layer of transparent electrodes 22, a light emitting layer 23, a cathode layer 24, a layer of transparent electrodes 25 and a cover glass layer 26. The central light emitting layer 23 comprises an inorganic EL light source using an inorganic compound or an organic EL light source using an organic compound. In general, an inorganic EL light source emits light when an electric field is impressed to the light emitting layer 23, while an organic EL light source emits light when the electrons of the electron transfer layer and the holes of the hole transfer layer in the light emitting layer 23 are recombined. The light emitting layer 23 of this image reading apparatus 1 may comprise either an inorganic EL light source or an organic EL light source.

Figure 3:
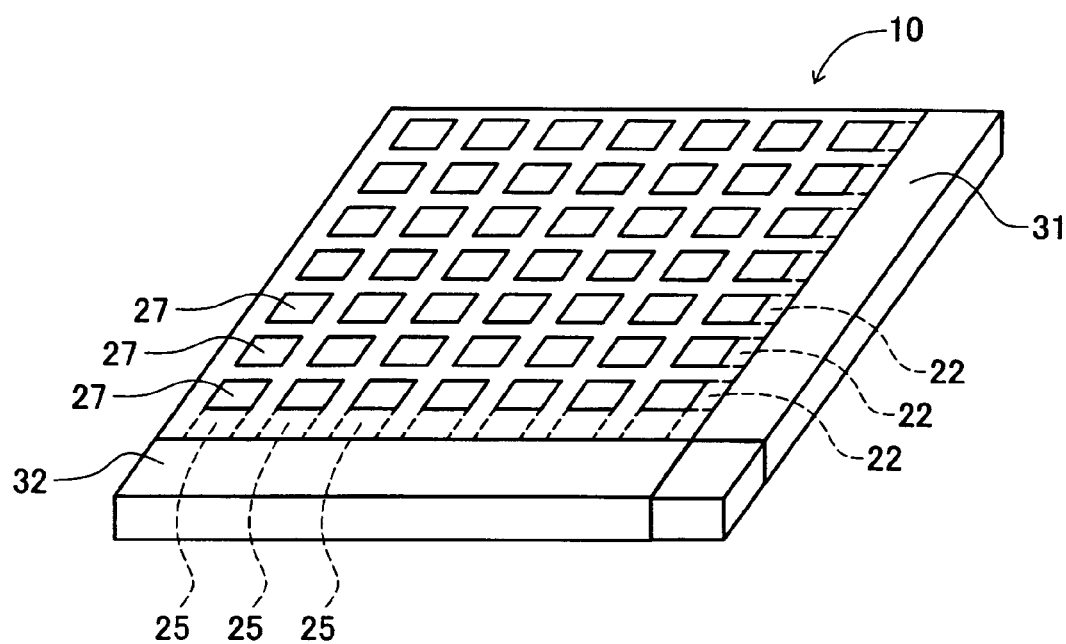
FIG. 3 is an explanatory drawing showing the basic construction of the drive circuit of the organic EL light source.

The transparent electrode layers 22, 25 comprise transparent electrodes using indium-tin oxide (ITO) and are voltage-controlled by drive circuits 31, 32 disposed at the edges of the original document plated 10, as shown in FIG. 3. These drive circuits 31, 32 are disposed outside the image reading area. The transparent electrode layers 22, 25 that are voltage-controlled by the drive circuits 31, 32 are disposed in an intersecting fashion such that they sandwich the light emitting layer 23 and the cathode layer 24, as shown in FIG. 2. The areas of intersection between the transparent electrode layer 22 and the transparent electrode layer 25 constitute light emitting units 27. In other words, light emitting units 27 are disposed in the original document platen 10 shown in FIG. 3 in a lattice configuration. In this drawing, the multiple band-like transparent electrodes 22 disposed in the lateral direction are selectively controlled by the drive circuit 31, while the multiple band-like transparent electrodes 25 disposed in the perpendicular direction are selectively controlled by the drive circuit 32. As a result, each light emitting unit 27 is driven to be illuminated or extinguished. In other words, by driving the light emitting units 27 arranged in a lattice configuration via the drive circuits 31, 32, the desired locations of the light emitting layer 23 can be selectively controlled to emit light.

Here, where the EL light source 20 is used as a light source for a color image reading apparatus 1, it is preferred that it comprise a white light source. In the case of an organic EL light source, white light can be obtained by combining organic EL materials for the three colors of red, green and blue. Alternatively, white light can also be obtained by simultaneously emitting light from stacked red, green and blue light emitting layers. On the other hand, in a monochrome apparatus, a green light source that is close to the center of the visible light characteristic is often selected. In this case, an EL light source 20 having only a green light emitting layer may be used.

The operation to read the image on the original document S via the image reading apparatus 1 of this embodiment will now be described. The user places the original document S on the original document platen 10 and instructs reading, whereby the reflecting mirror 11 is moved by a drive motor or the like. At the same time, the EL light source 20 in the original document platen 10 is driven by the drive circuits 31, 32 and light is emitted from the needed areas.

When this occurs, the area of the EL light source 20 located directly above the reflecting mirror 11 is driven in a synchronous fashion with the speed of scanning of the original document S or the speed of driving of the reflecting mirror 11 to not emit light, as shown in FIG. 1. Because the transparent electrodes 22, 25 are transparent, the light emitted from the light-emitting layer 23 travels toward the original document S and is dispersed downward in the drawing. When the direct light from the light emitting layer 23 strikes the reflecting mirror 11, there is a risk that it may contaminate the light that strikes the photoelectric conversion element and damage the quality of the read image. In this image reading apparatus 1, by ensuring that the area directly above the reflecting mirror 11 does not emit light, the amount of direct light striking the photoelectric conversion element can be reduced. On occasions when the image is read at 600 dpi, the width in the secondary scanning direction required for image reading is approximately 42.3 µm. In this instance, it is preferred that the non-light emitting area has at least this width.

This means that the EL light source 20 directly below the image reading position does not emit light. As a result, if the EL light source 20 is positioned too close to the original document S, the amount of light shined onto the reading area is reduced. On the other hand, it is preferred that the EL light source 20 be positioned as close as possible to the reflecting mirror 11. Therefore, it is preferred that the EL light source 20 be disposed underneath the original document platen 10, i.e., that it be disposed opposite the original document across the original document platen, as shown in FIG. 2. In other words, the cover glass 26 is thicker than the glass substrate layer 21. In the conventional art, the original document platen usually has a thickness of 3-4 mm in order to ensure that it has sufficient strength or for other reasons. The original document platen 10 of this embodiment can be made sufficiently strong by adjusting the thickness of the cover glass 26.

As a result, the light emitted from the EL light source 20 is irradiated onto the original document S and becomes reflected light that includes image information regarding the original document S. Because the original document platen 10 is transparent and light is not emitted from the area directly above the reflecting mirror 11, part of the reflected light from the original document S passes through the original document platen 10 and strikes the reflecting mirror 11. The light reflected from the reflecting mirror 11 is guided to the photoelectric conversion element by a lens and is output as image information.

Figure 4:
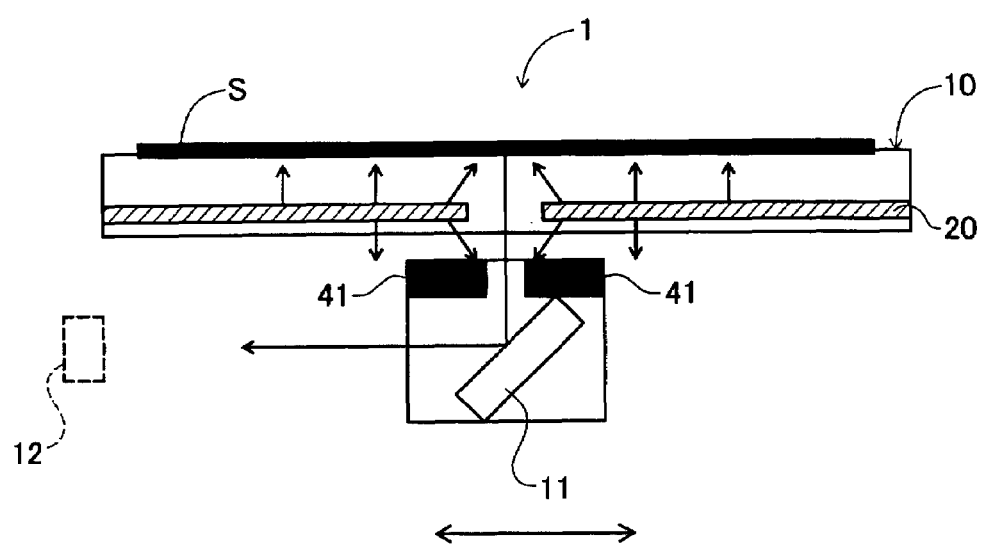
FIG. 4 is a cross-sectional drawing showing the basic construction of an image reading apparatus.

Here, the light emitted from the EL light source 20 in the original document platen 10 is selectively irradiated only upwards in FIG. 1, but light ordinarily travels in all directions. Accordingly, it is further preferred that a light blocking member be disposed on the original document platen side of the light receiving device, and a gap extending in the direction perpendicular to the direction of movement be formed on the light blocking member. In this way, only incident light that travels through the gap is received by the light-receiving device. Therefore, surrounding light coming directly from the light source can be prevented from striking the light-receiving device. For example, it is preferred that a light blocking plate 41 be disposed on the slider unit as shown in FIG. 4. The use of such a light blocking plate 41 prevents direct light from the EL light source 20 areas peripheral to the reading position from striking the reflecting mirror 11 and further improves the quality of the read image. In addition, it is acceptable if the surface of the light blocking plate 41 closer to the original document comprises a reflecting surface that reflects the light from the EL light source 20 and this reflected light is converged to the original document S reading position. In this case, the light emitted from the EL light source 20 is not wasted, thereby improving the efficiency of the image reading apparatus.

Figure 5:
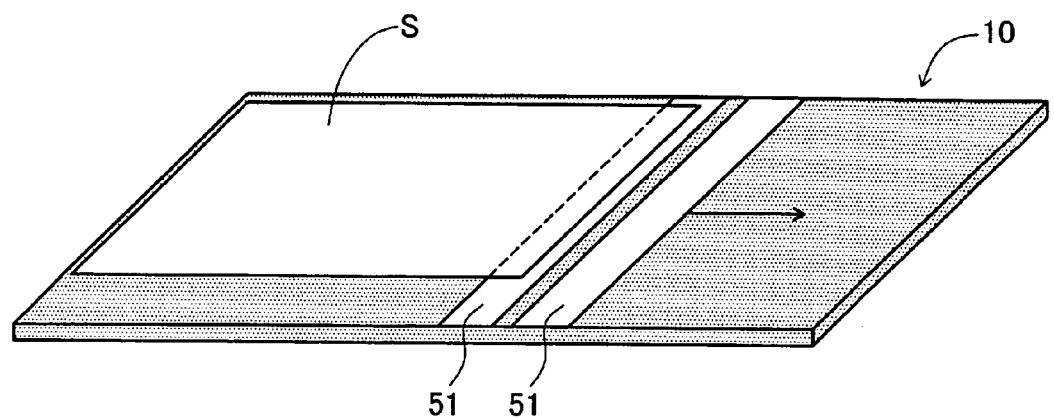
FIG. 5 is an explanatory drawing showing a driving method for an organic EL light source.

Another method of driving the EL light source 20 may entail causing prescribed areas of the EL light source 20 to emit light, as shown in FIGS. 5-8. For example, as shown in FIG. 5, the light emitting area 51 is deemed the area having a prescribed width in the direction of movement of the light receiving device, and the light emitting area move synchronously with the light receiving device during image reading. In this case, light is not emitted from locations far from the reading position of the original document. Here, because the light emitting area can be reduced in size, even lower power consumption can be achieved. Furthermore, where line control is executed as shown in FIG. 5, the lattice-like light emitting units 27 shown in FIG. 3 need not be used, and linear light emitting units may be used instead. In this case, the transparent electrode layers 22 and 25 need not be disposed in an intersecting fashion, and may be disposed in a parallel fashion aligned with the linear pixel units. Furthermore, if the potential of one layer of transparent electrodes is fixed and only the other layer of transparent electrodes is driven by a drive circuit, the apparatus can be made even thinner and control made even easier. In this case, the fixed-potential transparent electrodes need not have a linear configuration, and may comprise a common electrode large enough to cover multiple light emitting units.

Figure 6:
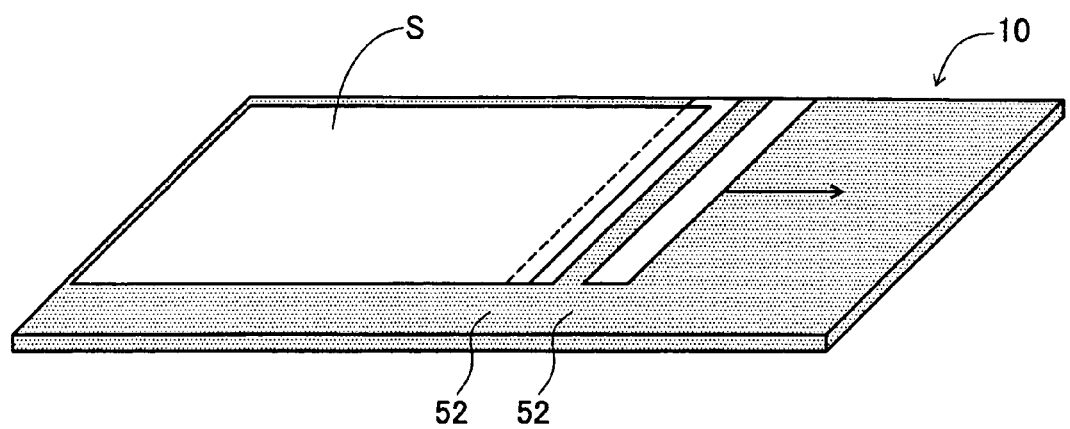
FIG. 6 is an explanatory drawing showing a driving method for an organic EL light source.

Alternatively, It is further preferred in the present invention that the length of the light emitting area along the direction perpendicular to the direction of movement of the light receiving device correspond to the width of the original document to be read. It is even more preferred that the length of the light emitting area match the width of the original document. In this case, light is not emitted from areas outside the width of the original document. For example, it is acceptable if the width of the original document in the main scanning direction is detected in advance by an original document size detection sensor and the light emitting area 52 is made to have a smaller width in the main scanning direction than the detected main scanning direction width, as shown in FIG. 6. This reduces the size of the light emitting area 52 to only the necessary area, thereby reducing power consumption.

Figure 7:
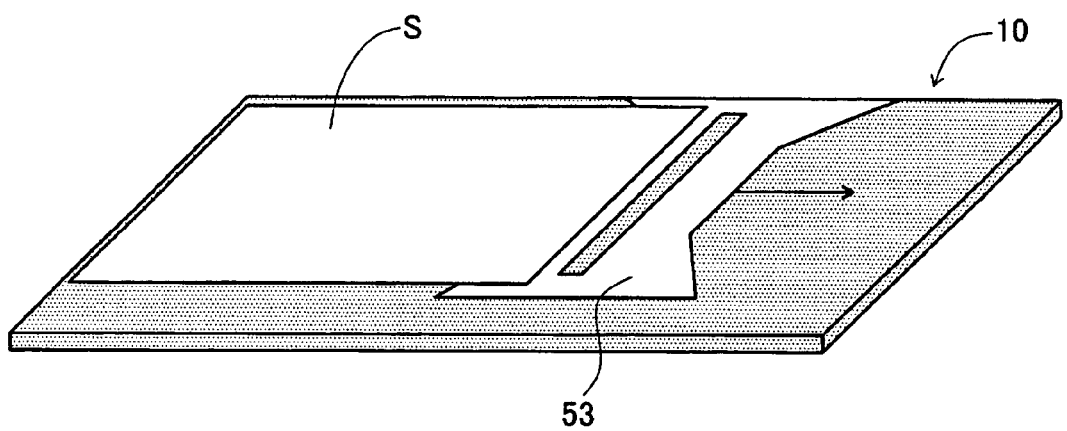
FIG. 7 is an explanatory drawing showing a driving method for an organic EL light source.

It is acceptable that the length of the light emitting area along the direction of movement of the light receiving device be longer at the ends of the original document width than in the center. For example, as shown in FIG. 7, if the light emitting area 53 is configured such that light is emitted from a larger area at the edges of the reading area along the main scanning direction than at the center area thereof. In an image reading apparatus using a reduction optical system, the reduction lens requires that the brightness at the edges of the image-forming surface be higher than at the center, because the brightness at the edges of the image forming surface decreases in accordance with the cosine fourth law for reduction lenses. By using a light emitting area 53 in FIG. 7 that has a larger light emitting area at the edges thereof along the main scanning direction, such light reduction can be compensated for. In this case, a white reference plate should be read in advance using the image reading apparatus 1 and the light emitting area 53 should be configured based on the output results from such reading.

Figure 8:
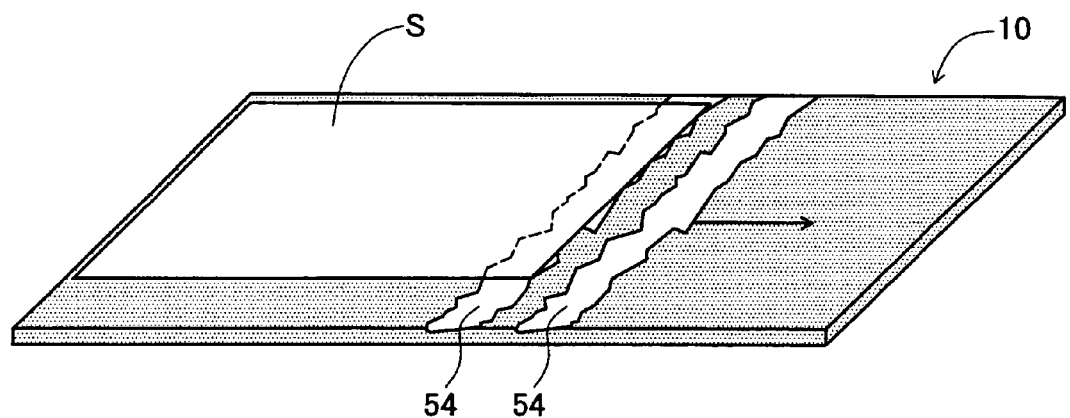
FIG. 8 is an explanatory drawing showing a driving method for an organic EL light source.

Alternatively, it is acceptable that the length of the light emitting area along the direction of movement of the light receiving device be configured in accordance with the variation in output of the electroluminescent layer or the variation in the sensitivity of the light receiving device. In this way, where variation exists in either the amount of light output by the electroluminescent layer or in the sensitivity of the light receiving device, such variation is corrected by the length of the light emitting area. For example, as shown in FIG. 8, a light emitting area 54 is configured based on various variations. The image reading apparatus 1 has various variation elements such as the EL light source 20 output variation, the photoelectric conversion element sensitivity variation and the reflecting mirror 11 reflection rate variation. Accordingly, a white reference plate is read using the image reading apparatus 1 and the light emitting area 54 is configured such that uniform output is obtained from the entire area of the light emitting area 54 based on the output results from such reading. In FIG. 8, the amount of light emission is adjusted by changing the length of the light emitting area along the direction of movement of the slider unit in accordance with the output results. Because this eliminates the need to make various corrections following reading, the speed of reading and processing can be increased. In addition, by having the image reading apparatus 1 read a white reference plate from time to time and re-configuring the light emitting area 54 based on the output results from such reading, correction can be made in response to changes that may occur over time. In addition, the light emitting area 54 can be configured in accordance with various reading conditions.

As described in detail above, according to the image reading apparatus 1 of this embodiment, because the EL light source 20 is disposed inside the original document platen 10, the light source is located close to the original document S and therefore sufficient brightness can be obtained even if a low-intensity, low-power light source is used. Furthermore, because the light source is not mounted on a slider unit, the slider unit can be made lightweight and thin.

This embodiment is only an example and does not limit the present invention in any fashion whatsoever. Therefore, the present invention can naturally be improved and modified in various ways within the essential scope thereof.

For example, in the embodiment described above, the passive drive method was used to drive the EL light source, but the active drive method using TFT electrodes or the like can be used instead.

In the embodiment described above, the light blocking plate 41 is mounted to a slider unit, but it is also acceptable if an electron shutter layer is disposed on the back side of the original document platen 10 such that light blocking occurs so as to match the light emitting area.

Figure 9:
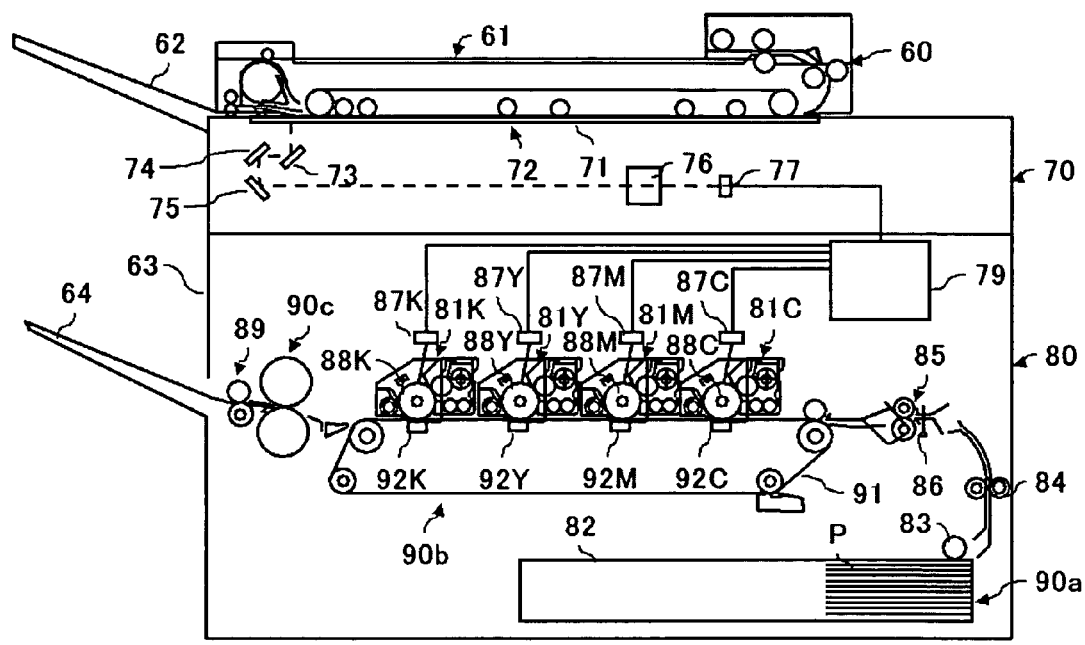
FIG. 9 is an explanatory drawing showing in a schematic fashion an example of the basic construction of the image forming apparatus of the present invention.
Figure 10:
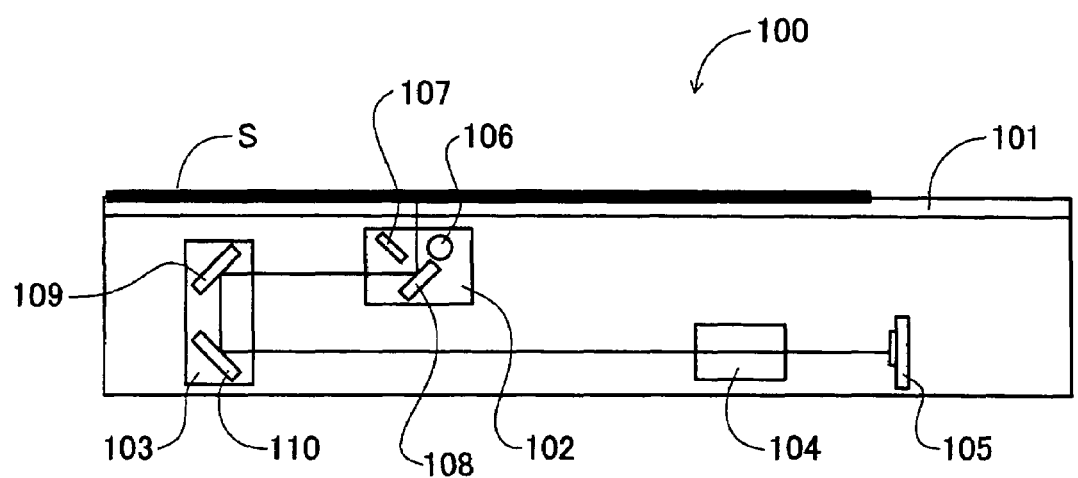
FIG. 10 is a cross-sectional drawing showing the basic construction of the image reading apparatus of the conventional art.

As an example of an image forming apparatus using the above image reading apparatus, a digital full color copier will now be described. FIG. 9 shows a front elevation of this digital full color copier (hereinafter simply 'copier').

As shown in FIG. 9, this copier comprises an original document feeder 60, an image reader 70 and a printer 80. The original document feeder 60 is a public-domain apparatus that automatically sends the multiple-sheet original document placed on an original document feeder tray 61 sheet by sheet onto the platen glass 71 of the image reader 70. After a sheet of the original document is read by the image reader 70, it is ejected to an original document eject tray 62.

The image reader 70 has the same construction as the image reading apparatus described above. It includes a reflecting mirror 73 that moves below the platen glass 71 in the direction indicated by the arrow, and guides the light emitted from an EL light source 72 disposed on the bottom surface of the platen glass 71 and reflected off of the original document to a color CCD image sensor (photoelectric conversion element) 77 via a conversion lens 76 while changing the light path thereof using mirrors 73-75. The CCD image sensor 77 converts the reflected light guided thereto into R, G, B image signals and outputs them to a controller 79.

The printer 80 comprises basically a paper supply device 90a, a transfer unit 90b, image formation units 81C-81K and a fusing unit 90c. A paper supply cassette 82 of the paper supply device 90a is disposed in the bottom area of a box 93 such that it can slide forward in the drawing, and a recording sheet P taken out from the paper supply cassette 82 by a paper supply roller 83 is conveyed downstream by a pair of intermediate rollers 84. After a timing pre-sensor 86 disposed on the downstream side of and immediately before a pair of timing rollers 85 is turned ON, the recording sheet P stands by with its top edge in contact with the timing rollers 85 that are not rotating. Subsequently, the recording sheet P is sent to the transfer unit 90b by the timing rollers 85 that are driven to rotate synchronously with the image formation operations of the image formation units. The timing rollers 85 are driven by a motor not shown, and the commencement and cessation of their rotation are controlled by the turning ON and OFF of a timing clutch (not shown) disposed between the motor and the timing rollers 85.

The conveyed recording sheet P is then sent further downstream by a conveyor belt 91 of the transfer unit 90b. At the same time, the image formation units 81C-81K are disposed above and along the length of the conveyor belt 91. The R, G, B electric signals input to the controller 79 are subjected to prescribed image processing by the controller 79 and broken down into the color components of C (cyan), M (magenta), Y (yellow) and K (black). Each laser diode (not shown) of the light units 87C-87K disposed in the upper area of each image formation unit 81C-81K is driven to emit modulated laser light based on the color component signals, and the modulated laser light is introduced into the image formation unit 41C-41K for the corresponding color component. The image formation units 81C-81K have photoreceptor drums 88C-88K, respectively, and a charger, a developing device, a cleaning blade and other components are disposed around each photoreceptor drum. The photoreceptor drums are exposed by the modulated laser light and the electrostatic latent images formed through the exposure are developed into toner images by the developing devices, or in other words, the image formation units 81C-81K form images using the so-called electrostatic copying method. The developing devices of each unit respectively supply C, M, Y, and K toner to the photoreceptor drums 88C-88K as developing agents in accordance with the modulated color component light of the light units 87C-87K.

Each toner image formed on the photoreceptor drums 88C-88K is sequentially transferred onto the recording sheet P conveyed by the conveyor belt 91 at the transfer positions below the photoreceptor drums 88C-88K based on the electrostatic force of the transfer charger 92C-92K disposed on the other side of the conveyor belt 91. The recording sheet P on which the toner images have been transferred is conveyed to the fusing unit 90c by the conveyer belt 91. After image fusion is carried out by the fusing unit 90c, the recording sheet P is ejected onto a tray 14 by a pair of eject rollers 89.

Because in the image forming apparatus having the construction described above a low-intensity, low-power light source can be used in the image reader and the slider unit is made lightweight and thin, the image forming apparatus can be made compact in size and have low power consumption.

The embodiments disclosed herein are examples in every aspect and do not limit the present invention in any respect. The range of the present invention is indicated not by the description provided above but by the claims, and is intended to include constructions equivalent to the claims, as well as all changes and modifications within the scope thereof.

What is claimed is:
1. An image reading apparatus comprising:
a platen on which an original document is placed;
an electroluminescent layer included in the platen;
a transparent electrode for impressing an electric field to the electroluminescent layer; and a light receiving device receiving light from the electroluminescent layer that is reflected off of the original document, wherein the electroluminescent layer comprises a non-light emitting area facing the light receiving device, and the non-light emitting area moves synchronously with the light receiving device in parallel with the platen during image reading.

2. The image reading apparatus according to claim 1, wherein the electroluminescent layer and the transparent electrode is disposed opposite the original document across the original document platen.

3. An image reading apparatus comprising:
a platen on which an original document is placed;
an electroluminescent layer included in the platen;
a transparent electrode impressing an electric field to the electroluminescent layer;
a light receiving device receiving light from the electroluminescent layer that is reflected off of the original document; and
a light blocking member disposed on the side closer to the platen of the light receiving device and having a gap formed on the light blocking member;
wherein the gap extends in the direction perpendicular to the direction of movement of the light receiving device disposed movably in parallel to the platen.

4. The image reading apparatus according to claim 3, wherein a surface of the light blocking member closer to the original document comprises a reflecting surface.

5. The image reading apparatus according to claim 1, wherein the electroluminescent layer includes a light emitting area only adjacent to the non-light emitting area and the light emitting area moves synchronously with the non-light emitting area during image reading.

6. The image reading apparatus according to claim 5, wherein a length of the light emitting area along the direction perpendicular to the direction of movement of the light receiving device is configured in accordance with a width of the original document.

7. The image reading apparatus according to claim 5, wherein a length of the light emitting area along the direction of movement of the light receiving device is longer at ends of the width of the original document than in center.

8. The image reading apparatus according to claim 5, wherein a length of the light emitting area along the direction of movement of the light receiving device is configured in accordance with a variation in output of the electroluminescent layer or a variation in sensitivity of the light receiving device.

9. An image forming apparatus comprising:
an image reading apparatus for reading an original document and outputting image signal; and
a printing device for forming images based on the image signal;
wherein the image reading apparatus comprises:
a platen on which an original document is placed;
an electroluminescent layer included in the platen;
a transparent electrode for impressing an electric field to the electroluminescent layer; and
a light receiving device receiving light from the electroluminescent layer that is reflected off of the original document and movable in parallel with the platen, the electroluminescent layer being configured so that portions of the electroluminescent layer emit light alternatively in synchronization with the movement of the light receiving device.

10. An image reading method comprising:
irradiating an original document placed on a platen with a light emitted by an electroluminescent layer included in the platen; and
receiving light from the electroluminescent layer that is reflected off of the original document by use of a light receiving device;
wherein the irradiating the original document comprises forming a non-light emitting area included in the electroluminescent layer facing a reading area in the original document, and moving the non-light emitting area synchronously with the light receiving device during image reading.

11. The image reading method according to claim 10, further comprising:
moving the light receiving device parallel to the platen during image reading.

12. The image reading method according to claim 11, wherein the moving of the non-light emitting area comprises driving a light emitting unit included in the electroluminescent layer to be illuminated or extinguished synchronously with the movement of the light receiving device.

13. The image reading method according to claim 11, further comprising:
forming a light emitting area included in the electroluminescent layer only adjacent to the non-light emitting area; and
moving the light emitting area synchronously with the light receiving device during image reading.

14. The image reading method according to claim 13, wherein the moving of the light emitting area comprises driving a light emitting unit included in the electroluminescent layer to be illuminated or extinguished synchronously with the movement of the light receiving device.

15. The image reading method according to claim 14, further comprising:
detecting a width of the original document in the direction perpendicular to the direction of movement of the light receiving device; and
configuring a length of the light emitting area along the direction perpendicular to the direction of movement of the light receiving device in accordance with the detected width of the original document.

16. The image reading method according to claim 14, further comprising:
detecting the width of the original document along the direction perpendicular to the direction of movement of the light receiving device; and
configuring a length of the light emitting area along the direction of movement of the light receiving device such that the length is longer at ends of the detected width of the original document than in center.

17. The image reading method according to claim 14, further comprising:
configuring a length of the light emitting area along the direction of movement of the light receiving device in accordance with a variation in output of the electroluminescent layer or a variation in sensitivity of the light receiving device.

* * * * *

UNITED STATES PATENT AND TRADEMARK OFFICE
CERTIFICATE OF CORRECTION

| | | |
|---|---|---|
| PATENT NO. | : 7,692,822 B2 | Page 1 of 1 |
| APPLICATION NO. | : 11/009001 | |
| DATED | : April 6, 2010 | |
| INVENTOR(S) | : Masahiko Tanaka | |

It is certified that error appears in the above-identified patent and that said Letters Patent is hereby corrected as shown below:

<u>On the title page:</u>

Under item 75, the inventor's city of residence please delete "Chiyoda-ku" and add --Toyokawa-shi (JP)--

Signed and Sealed this

Thirteenth Day of July, 2010

David J. Kappos
*Director of the United States Patent and Trademark Office*